(12) United States Patent
Mann et al.

(10) Patent No.: US 8,971,215 B2
(45) Date of Patent: Mar. 3, 2015

(54) SUBSCRIBER ASSIGNMENT

(75) Inventors: Robert A. Mann, Carp (CA); Lui Chu Yeung, Kanata (CA)

(73) Assignee: Alcatel Lucent, Boulogne-Billancourt (FR)

( * ) Notice: Subject to any disclaimer, the term of this patent is extended or adjusted under 35 U.S.C. 154(b) by 309 days.

(21) Appl. No.: 13/343,378

(22) Filed: Jan. 4, 2012

(65) Prior Publication Data

US 2013/0170431 A1    Jul. 4, 2013

(51) Int. Cl.
*H04L 12/16* (2006.01)
*H04W 4/02* (2009.01)
*H04W 8/02* (2009.01)
*H04W 8/18* (2009.01)

(52) U.S. Cl.
USPC ........... 370/259; 370/252; 370/328; 370/401; 455/406; 455/408; 455/456.1; 709/203; 709/224

(58) Field of Classification Search
None
See application file for complete search history.

(56) References Cited

U.S. PATENT DOCUMENTS

| 7,054,307 | B2 * | 5/2006 | Papadimitriou et al. ...... 370/353 |
|---|---|---|---|
| 7,522,921 | B2 * | 4/2009 | Thompson ..................... 455/433 |
| 8,532,125 | B2 * | 9/2013 | Li et al. ........................ 370/401 |
| 2007/0232301 | A1 * | 10/2007 | Kueh ............................ 455/433 |
| 2008/0305794 | A1 * | 12/2008 | Mukaiyama et al. ...... 455/435.1 |
| 2009/0177650 | A1 * | 7/2009 | Petersson et al. ................. 707/5 |
| 2009/0228956 | A1 * | 9/2009 | He et al. ........................... 726/1 |
| 2009/0237112 | A1 * | 9/2009 | Huang et al. .................... 326/38 |
| 2009/0327112 | A1 * | 12/2009 | Li et al. ........................... 705/34 |
| 2011/0141886 | A1 * | 6/2011 | Lee et al. ....................... 370/230 |
| 2011/0222399 | A1 * | 9/2011 | Shi et al. ....................... 370/230 |
| 2011/0302289 | A1 * | 12/2011 | Shaikh et al. ................. 709/223 |
| 2012/0202550 | A1 * | 8/2012 | Marsico ........................ 455/515 |
| 2013/0036032 | A1 * | 2/2013 | Cai et al. ......................... 705/30 |
| 2013/0097305 | A1 * | 4/2013 | Albal ............................ 709/224 |

* cited by examiner

*Primary Examiner* — Candal Elpenord
(74) *Attorney, Agent, or Firm* — Kramer Amado P.C.

(57) ABSTRACT

Various exemplary embodiments relate to a method and related network node including one or more of the following: receiving, at the network device from an entity, a request for a serving device assigned to a subscriber; attempting to locate an assignment record associated with the subscriber; in response to locating the assignment record associated with the subscriber, identifying an assigned serving device of the multiple serving devices indicated by the assignment record as being assigned to the subscriber; and transmitting a response to the entity, wherein the response identifies the assigned serving device.

20 Claims, 5 Drawing Sheets

SUBSCRIBER ASSIGNMENT

TECHNICAL FIELD

Various exemplary embodiments disclosed herein relate generally to telecommunications networks.

BACKGROUND

As the demand increases for varying types of applications within mobile telecommunications networks, service providers must constantly upgrade their systems in order to reliably provide this expanded functionality. What was once a system designed simply for voice communication has grown into an all-purpose network access point, providing access to a myriad of applications including text messaging, multimedia streaming, and general Internet access. In order to support such applications, providers have built new networks on top of their existing voice networks, leading to a less-than-elegant solution. As seen in second and third generation networks, voice services must be carried over dedicated voice channels and directed toward a circuit-switched core, while other service communications are transmitted according to the Internet Protocol (IP) and directed toward a different, packet-switched core. This led to unique problems regarding application provision, metering and charging, and quality of experience (QoE) assurance.

In an effort to simplify the dual core approach of the second and third generations, the 3rd Generation Partnership Project (3GPP) has recommended a new network scheme it terms "Long Term Evolution" (LTE). In an LTE network, all communications are carried over an IP channel from user equipment (UE) to an all-IP core called the Evolved Packet Core (EPC). The EPC then provides gateway access to other networks while ensuring an acceptable QoE and charging a subscriber for their particular network activity.

The 3GPP generally describes the components of the EPC and their interactions with each other in a number of technical specifications. Specifically, 3GPP TS 29.212, 3GPP TS 29.213, and 3GPP TS 29.214 describe the Policy and Charging Rules Function (PCRF), Policy and Charging Enforcement Function (PCEF), Bearer Binding and Event Reporting Function (BBERF), and subscription profiled repository (SPR) of the EPC. These specifications further provide some guidance as to how these elements interact in order to provide reliable data services and charge subscribers for use thereof.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method performed by a network device for distributing subscribers among multiple serving devices, the method comprising: receiving, at the network device from an entity, a request for a serving device assigned to a subscriber; attempting to locate an assignment record associated with the subscriber; in response to locating the assignment record associated with the subscriber, identifying an assigned serving device of the multiple serving devices indicated by the assignment record as being assigned to the subscriber; and transmitting a response to the entity, wherein the response identifies the assigned serving device.

Various exemplary embodiments relate to a subscriber assignment device comprising: an interface that receives a request for an assigned blade from an entity, wherein the request includes an identifier associated with a requested subscriber; a subscriber assignment storage that stores a plurality of assignment records, wherein each assignment record is associated with a subscriber and includes an identification of an assigned blade; an identifier lookup module configured to attempt to locate an assignment record of the plurality of assignment records that includes the identifier associated with the requested subscriber; and an assigned blade reporter configured to, in response to the identifier lookup module locating the assignment record, report the identification of an assigned blade included in the assignment record to the entity.

Various exemplary embodiments relate to a tangible and non-transitory machine-readable storage medium encoded with instructions for execution by a network device for distributing subscribers among multiple serving devices, the tangible and non-transitory machine-readable storage medium comprising: instructions for receiving, at the network device from an entity, a request for a serving device assigned to a subscriber; instructions for attempting to locate an assignment record associated with the subscriber; instructions for, in response to locating the assignment record associated with the subscriber, identifying an assigned serving device of the multiple serving devices indicated by the assignment record as being assigned to the subscriber; and instructions for transmitting a response to the entity, wherein the response identifies the assigned serving device.

Various embodiments are described wherein the step of attempting to locate an assignment record comprises: extracting at least one subscription identifier from the request; and attempting to locate an assignment record including the at least one subscription identifier.

Various embodiments are described further comprising: receiving, at the network device from a second entity, a second request for a serving device assigned to the subscriber; extracting at least one user identifier from the second request, wherein the at least one user identifier is a different type from the at least one subscription identifier; attempting to locate the assignment record based on the at least one user identifier, wherein the assignment record includes the at least one user identifier; and in response to locating the assignment record based on the at least one user identifier, transmitting a second response to the second entity, wherein the second response identifies the assigned serving device.

Various embodiments are described wherein the step of attempting to locate an assignment record associated with the subscriber comprises: determining that the network device does not store an assignment record associated with the subscriber; assigning a serving device of the plurality of serving devices to the subscriber; and generating a new assignment record associated with the subscriber and including an indication of the assigned serving device.

Various embodiments are described wherein the assigned serving device is a policy and charging rules node (PCRN) blade and wherein the entity includes at least one of a diameter proxy agent and a common services blade (CSB).

Various embodiments are described wherein the step of attempting to locate an assignment record associated with the subscriber comprises: determining whether the request includes at least one subscription identifier of the subscriber; if the request includes at least one subscription identifier, attempting to locate an assignment record that includes the at least one subscription identifier; if the request does not include at least one subscription identifier: determining whether the request includes at least one user identifier of the subscriber, wherein the user identifier is of a type different from the subscription identifier; if the request includes at least one user identifier, attempting to locate an assignment record that includes the at least one user identifier.

Various embodiments are described wherein the step of attempting to locate an assignment record associated with the subscriber comprises: determining that the request includes an identifier associated with the subscriber; determining that the assignment record associated with the subscriber does not include the identifier associated with the subscriber; and adding the identifier to the assignment record.

Various embodiments are described wherein the subscriber assignment device and the entity are collocated on a single blade.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

Figure 1:
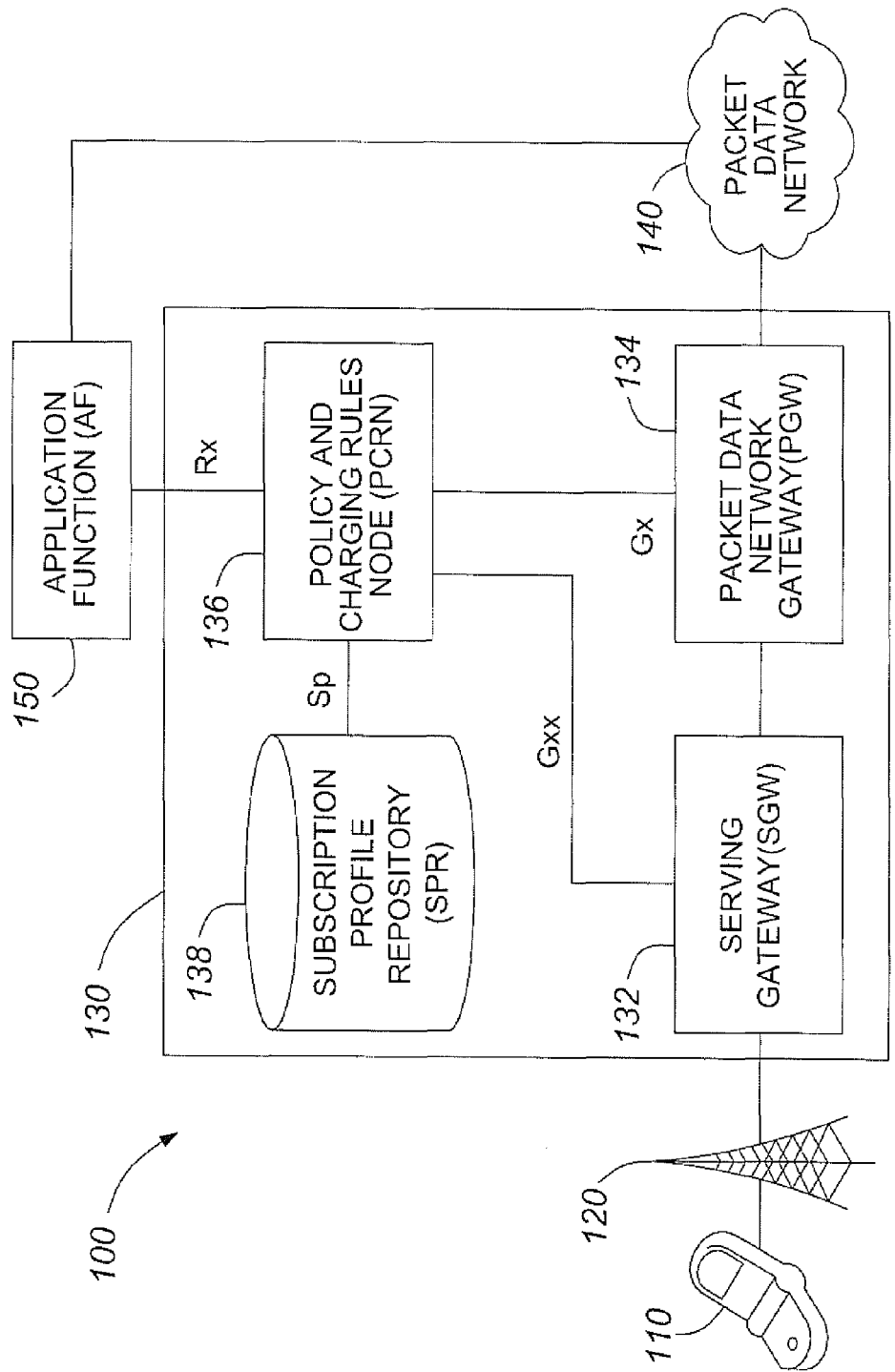
FIG. 1 illustrates an exemplary subscriber network for providing various data services.

In various applications, it may be useful or necessary to provide multiple devices implementing the policy and charging rules function to efficiently handle the number of requests received in an evolved packet core. Doing so, however, raises additional considerations of how to effectively coordinate the operation of such redundant devices. For example, each device may utilize various subscriber records in providing its functionality. If two devices utilize the same subscriber record, it may be important to ensure consistency between the two copies of the record. Further, provisioning and/or caching on subscriber records across the multiple devices may introduce additional inefficiencies.

In view of the foregoing, it would be desirable to provide a system capable of providing multiple device instances while increasing overall system efficiency. In particular, it would be desirable to assign subscribers to device instances to obviate the need for at least some coordination between device instances while increasing the efficiency of provisioning and/or caching records at the device instances.

Referring now to the drawings, in which like numerals refer to like components or steps, there are disclosed broad aspects of various exemplary embodiments.

FIG. 1 illustrates an exemplary subscriber network 100 for providing various data services. Exemplary subscriber network 100 may be a telecommunications network or other network for providing access to various services. Exemplary subscriber network 100 may include user equipment 110, base station 120, evolved packet core (EPC) 130, packet data network 140, and application function (AF) 150.

User equipment 110 may be a device that communicates with packet data network 140 for providing the end-user with a data service. Such data service may include, for example, voice communication, text messaging, multimedia streaming, and Internet access. More specifically, in various exemplary embodiments, user equipment 110 is a personal or laptop computer, wireless email device, cell phone, tablet, television set-top box, or any other device capable of communicating with other devices via EPC 130.

Base station 120 may be a device that enables communication between user equipment 110 and EPC 130. For example, base station 120 may be a base transceiver station such as an evolved nodeB (eNodeB) as defined by 3GPP standards. Thus, base station 120 may be a device that communicates with user equipment 110 via a first medium, such as radio waves, and communicates with EPC 130 via a second medium, such as Ethernet cable. Base station 120 may be in direct communication with EPC 130 or may communicate via a number of intermediate nodes (not shown). In various embodiments, multiple base stations (not shown) may be present to provide mobility to user equipment 110. Note that in various alternative embodiments, user equipment 110 may communicate directly with EPC 130. In such embodiments, base station 120 may not be present.

Evolved packet core (EPC) 130 may be a device or network of devices that provides user equipment 110 with gateway access to packet data network 140. EPC 130 may further charge a subscriber for use of provided data services and ensure that particular quality of experience (QoE) standards are met. Thus, EPC 130 may be implemented, at least in part, according to the 3GPP TS 29.212, 29.213, and 29.214 standards. Accordingly, EPC 130 may include a serving gateway (SGW) 132, a packet data network gateway (PGW) 134, a policy and charging rules node (PCRN) 136, and a subscription profile repository (SPR) 138.

Serving gateway (SGW) 132 may be a device that provides gateway access to the EPC 130. SGW 132 may be the first device within the EPC 130 that receives packets sent by user equipment 110. SGW 132 may forward such packets toward PGW 134. SGW 132 may perform a number of functions such as, for example, managing mobility of user equipment 110 between multiple base stations (not shown) and enforcing particular quality of service (QoS) characteristics for each flow being served. In various implementations, such as those implementing the Proxy Mobile IP standard, SGW 132 may include a Bearer Binding and Event Reporting Function (BBERF). In various exemplary embodiments, EPC 130 may include multiple SGWs (not shown) and each SGW may communicate with multiple base stations (not shown).

Packet data network gateway (PGW) 134 may be a device that provides gateway access to packet data network 140. PGW 134 may be the final device within the EPC 130 that receives packets sent by user equipment 110 toward packet data network 140 via SGW 132. PGW 134 may include a policy and charging enforcement function (PCEF) that enforces policy and charging control (PCC) rules for each service data flow (SDF). Therefore, PGW 134 may be a policy and charging enforcement node (PCEN). PGW 134 may include a number of additional features such as, for example, packet filtering, deep packet inspection, and subscriber charging support. PGW 134 may also be responsible for requesting resource allocation for unknown application services.

Policy and charging rules node (PCRN) 136 may be a device or group of devices that receives requests for application services, generates PCC rules, and provides PCC rules to the PGW 134 and/or other PCENs (not shown). PCRN 136 may be in communication with AF 150 via an Rx interface. As described in further detail below with respect to AF 150, PCRN 136 may receive an application request in the form of an Authentication and Authorization Request (AAR) (not shown) from AF 150. Upon receipt of the AAR, PCRN 136 may generate at least one new PCC rule for fulfilling the application request.

PCRN 136 may also be in communication with SGW 132 and PGW 134 via a Gxx and a Gx interface, respectively. PCRN 136 may receive an application request in the form of a credit control request (CCR) (not shown) from SGW 132 or PGW 134. As with an AAR, upon receipt of a CCR, PCRN may generate at least one new PCC rule for fulfilling the application request. In various embodiments, the AAR and the CCR may represent two independent application requests to be processed separately, while in other embodiments, the AAR axed the CCR may carry information regarding a single application request and PCRN 136 may create at least one PCC rule based on the combination of the AAR and the CCR. In various embodiments, PCRN 136 may be capable of handling both single-message and paired-message application requests.

Upon creating a new PCC rule or upon request by the PGW 134, PCRN 136 may provide a PCC rule to PGW 134 via the Gx interface. In various embodiments, such as those implementing the PMIP standard for example, PCRN 136 may also generate QoS rules. Upon creating a new QoS rule or upon request by the SGW 132, PCRN 136 may provide a QoS rule to SGW 132 via the Gxx interface.

Subscription profile repository (SPR) 138 may be a device that stores information related to subscribers to the subscriber network 100. Thus, SPR 138 may include a machine-readable storage medium such as read-only memory (ROM), random-access memory (RAM), magnetic disk storage media, optical storage media, flash-memory devices, and/or similar storage media. SPR 138 may be a component of PCRN 136 or may constitute an independent node within EPC 130. Data stored by SPR 138 may include an identifier of each subscriber and indications of subscription information for each subscriber such as bandwidth limits, charging parameters, and subscriber priority.

Packet data network 140 may be any network for providing data communications between user equipment 110 and other devices connected to packet data network 140, such as AF 150. Packet data network 140 may further provide, for example, phone and/or Internet service to various user devices in communication with packet data network 140.

Application function (AF) 150 may be a device that provides a known application service to user equipment 110. Thus, AF 150 may be a server or other device that provides, for example, a video streaming or voice communication service to user equipment 110. AF 150 may further be in communication with the PCRN 136 of the EPC 130 via an Rx interface. When AF 150 is to begin providing known application service to user equipment 110, AF 150 may generate an application request message, such as an authentication and authorization request (AAR) according to the Diameter protocol, to notify the PCRN 136 that resources should be allocated for the application service. This application request message may include information such as an identification of the subscriber using the application service, an IP address of the subscriber, an access point name (APN) for an associated IP-CAN session, and/or an identification of the particular service data flows that must be established in order to provide the requested service. AF 150 may communicate such an application request to the PCRN 136 via the Rx interface.

Figure 2:
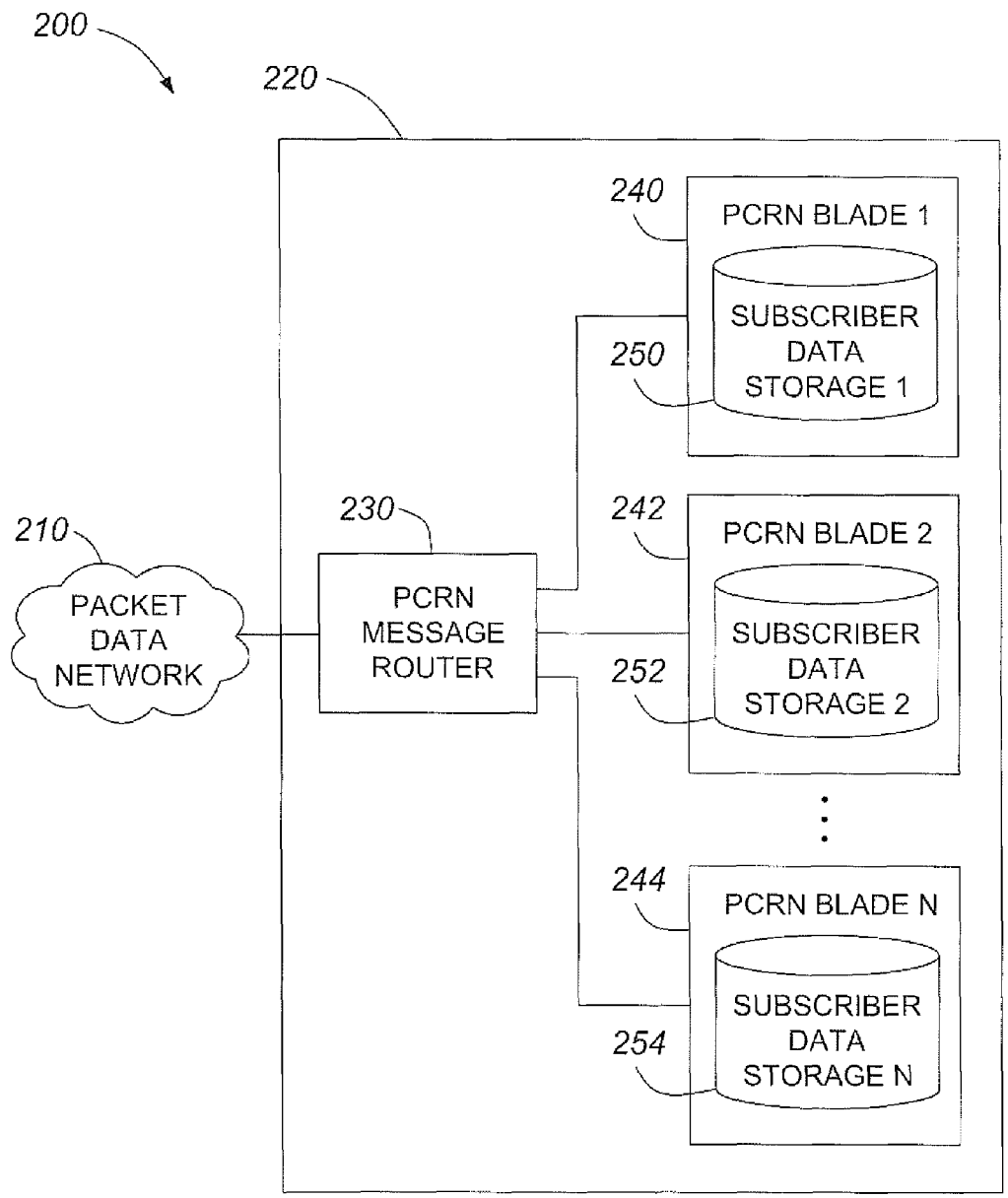
FIG. 2 illustrates an alternative view of the subscriber network of FIG. 1.

FIG. 2 illustrates an alternative view 200 of the subscriber network 100 of FIG. 1. As shown in alternative view 200, exemplary subscriber network 100 may be represented as a network 210 and a policy and charging rules node (PCRN) 220. Network 210 may correspond to one or more devices of exemplary network 100 such as, for example, user equipment 110, PGW 134, and/or AF 150. PCRN 220 may correspond to PCRN 136 of FIG. 1.

To provide scalability and increased processing capacity, PCRN 220 may be organized as a number of separate PCRN blades 240, 242, 244 that communicate with network 210 via a PCRN message router 230. As such, PCRN message router 230 may route messages between network 210 and PCRN blades 240, 242, 244. In various embodiments, PCRN message router 230 may be at least partially disposed within the same chassis as PCRN blades 240, 242, 244.

PCRN message router 230 may include a device or group of devices adapted to receive various messages from network 210. For each received message, PCRN message router 230 may identify an appropriate PCRN blade 240, 242, 244 to process the message. For example, in various embodiments, each subscriber may be associated with one PCRN blade 240, 242, 244. In such embodiments, PCRN message router 230 may use information carried by the message to identify a subscriber associated with the message. PCRN message router 230 may then use an assignment record, such as a record stored locally or in an SPR, to determine a PCRN blade 240, 242, 244 associated with the subscriber. Finally, PCRN message router 230 may forward a message to that PCRN blade 240, 242, 244. Various alternative methods of PCRN blade assignment and/or forwarding messages to appropriate PCRN blades will be apparent to those of skill in the art. In various embodiments, PCRN message router 230 may also forward messages received from PCRN Blades 240, 242, 244 to appropriate elements of network 210.

PCRN 220 may also include a plurality of PCRN blades 240, 242, 244. It should be noted that, while three PCRN blades 240, 242, 244 are illustrated, various embodiments may include fewer or more PCRN blades. Further, the number of PCRN blades 240, 242, 244 may change during operation of PCRN 220. For example, an administrator may remove PCRN blades that are faulty and/or may add new PCRN blades (not shown) to increase the capacity of PCRN 220.

Each PCRN blade 240, 242, 244 may include a complete implementation of a policy and charging rules function (PCRF) as defined by the 3GPP. Each PCRN blade 240, 242, 244 may be implemented on an independent circuit board and may include various hardware components such as processors, main memory, network and/or backplane interfaces, and/or data storage devices. Accordingly, each PCRN blade 240, 242, 244 may be adapted to perform various PCRF functions such as receiving request messages, processing request messages to create policy and charging control (PCC) rules, installing PCC rules at other nodes. PCRN blades 240, 242, 244 may each be referred to generally as "serving devices."

Each PCRN blade 240, 242, 244 may store subscriber data in subscriber data storage 250, 252, 254. In various embodiments, subscriber data storage 250, 252, 254 may constitute a distributed subscription profile repository (SPR), wherein each PCRN blade 240, 242, 244 stores a portion of the SPR. In other embodiments, subscriber data storage 250, 252, 254 may operate as caches for an external SPR. Because each subscriber may be assigned to a particular PCRN blade 240, 242, 244, the PCRN blade 240, 242, 244 may only serve a portion of the total subscriber base. As such, the number of possible records stored in each of subscriber data storages 250, 252, 254 is reduced to the number of subscribers assigned to that PCRN blade 240, 242, 244. For example, in embodiments wherein subscriber data storage 250, 252, 254 constitute a distributed SPR, each PCRN blade 240, 242, 244 may store the records for those subscribers assigned thereto. In other embodiments wherein subscriber data storage 250, 252, 254 act as a cache, PCRN blades 240, 242, 244 may only cache records for subscribers assigned thereto, which may improve the overall cache hit rate. Various additional benefits will be apparent to those of skill in the art.

Figure 3:
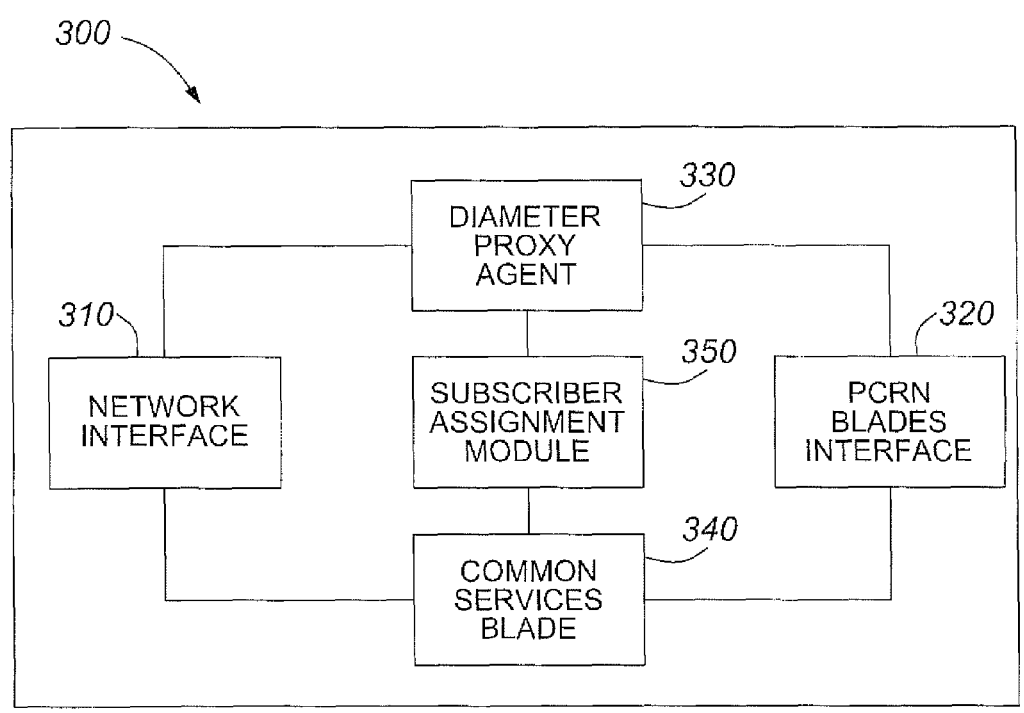
FIG. 3 illustrates an exemplary policy and charging rules node (PCRN) message router.

FIG. 3 illustrates an exemplary policy and charging rules node (PCRN) message router 300. PCRN message router 300 may correspond to PCRN message router 230 of PCRN 220. PCRN message router 300 may include a network interface 310, PCRN blades interface 320, diameter proxy agent (DPA) 330, common services blade (CSB) 340, and/or subscriber assignment module (SAM) 350. It should be noted that while the components of message router 300 are illustrated as belonging to a single device, various alternative embodiments may implement various components in separate devices. For example, DPA 330 may be implemented on a first blade and CSB 340 may be implemented on a second blade. SAM 350 may be implemented together with DPA 330, CSB 340, or on a separate third blade. Various alternative arrangements of the components of PCRN message router 300 will be apparent to those of skill in the art. Further, various modifications for effecting such alternative arrangements will be apparent to those of skill in the art.

Network interface 310 may be an interface comprising hardware and/or executable instructions encoded on a machine-readable storage medium configured to communicate with at least one other device such as, for example, a PGW and/or AF. In various embodiments, network interface 310 may be an Ethernet interface. During operation, network interface 310 may receive a request message from another device and forward the message to an appropriate module for processing. In various embodiments, network interface 310 may forward messages formed according to the Diameter protocol to the DPA 330. Further, network interface 310 may forward other messages referred to as "Non-Diameter messages," to the CSB 340. In various embodiments wherein DPA 330 and CSB 340 are provided on different blades and/or in different devices, DPA 330 and CSB 340 may receive messages from separate network interfaces (not shown) respectively.

PCRN blades interface 320 may be an interface comprising hardware and/or executable instructions encoded on a machine-readable storage medium configured to communicate with one or more PCRN blades. In various embodiments, PCRN blade interface 320 may include an Ethernet, PCI, SCSI, ATA, and/or other hardware interface technologies. In various embodiments, PCRN blades interface 320 may include a blade server backplane. In various embodiments, PCRN blades interface 320 may be the same physical device as network interface 310.

Diameter proxy agent (DPA) 330 may include hardware and/or executable instructions on a machine-readable storage medium configured to route various Diameter messages received via network interface 310 to an appropriate PCRN blade via PCRN blades interface 320. DPA 330 may also be configured to forward messages in the reverse direction, from various PCRN blades to other devices. In forwarding a message to an appropriate PCRN blade, DPA 330 may be configured to request an appropriate blade from SAM 350. In doing so, DPA 330 may extract one or more subscription identifiers from the Diameter message and forward them to SAM 350. The term "subscription identifiers" will be understood to refer to one or more identifiers specified by the 3GPP as serving to identify a subscriber to various nodes. Thus, the DPA 330 may extract an International Mobile Subscriber Identity (IMSI), Network Access Identifier (NAT), a circuit ID, a Point-to-Point Protocol ID (PPP ID), a Mobile Subscriber ISDN Number (MSISDN), and/or other identifiers carried in a Subscription-ID attribute-value pair (AVP) or elsewhere in the Diameter message. In various alternative embodiments, DPA 330 may instead forward the entire message to SAM 350, which may then perform such extraction.

Common services blade (CSB) 340 may include hardware and/or executable instructions on a machine-readable storage medium configured to route various Non-Diameter messages received via network interface 310 to an appropriate PCRN blade via PCRN blades interface 320. Such Non-Diameter messages may be related to various operations, administration, and maintenance (OAM) functions performed by the CSB 340 and/or PCRN blades and may be transported over HTTP or any other protocol. CSB 340 may also be configured to forward messages in the reverse direction, from various PCRN blades to other devices. In forwarding a message to an appropriate PCRN blade, CSB 340 may extract one or more user identifiers from the Non-Diameter message and forward them to SAM 350. As used herein, the term "user identifier" will be understood to refer to any identifier carried by a Non-Diameter message to identify a subscriber. In various embodiments, user identifiers may encompass other identifiers than would be carried by a Diameter message. For example, the Non-Diameter message may carry one or more user names associated with various OAM functions or identifiers of active Diameter sessions. In various alternative embodiments, CSB 340 may instead forward the entire message to SAM 350, which may then perform such extraction.

Subscriber assignment module (SAM) 350 may include hardware and/or executable instructions on a machine-readable storage medium configured to report to the DPA 330 and/or CSB 340 which PCRN blade is assigned to a particular subscriber. As such, SAM 350 may receive one or more subscriber identifiers and/or one or more user identifiers, look up a record associated with the identifiers, and return an assigned blade identification based on the record. If no record is found, SAM 350 may be configured to assign a blade to the subscriber and store a new record for future reference. In various embodiments, SAM 350 may also be configured to learn new identifiers for stored records. An exemplary detailed operation of SAM 350 will be described below with respect to FIGS. 4-5.

Figure 4:
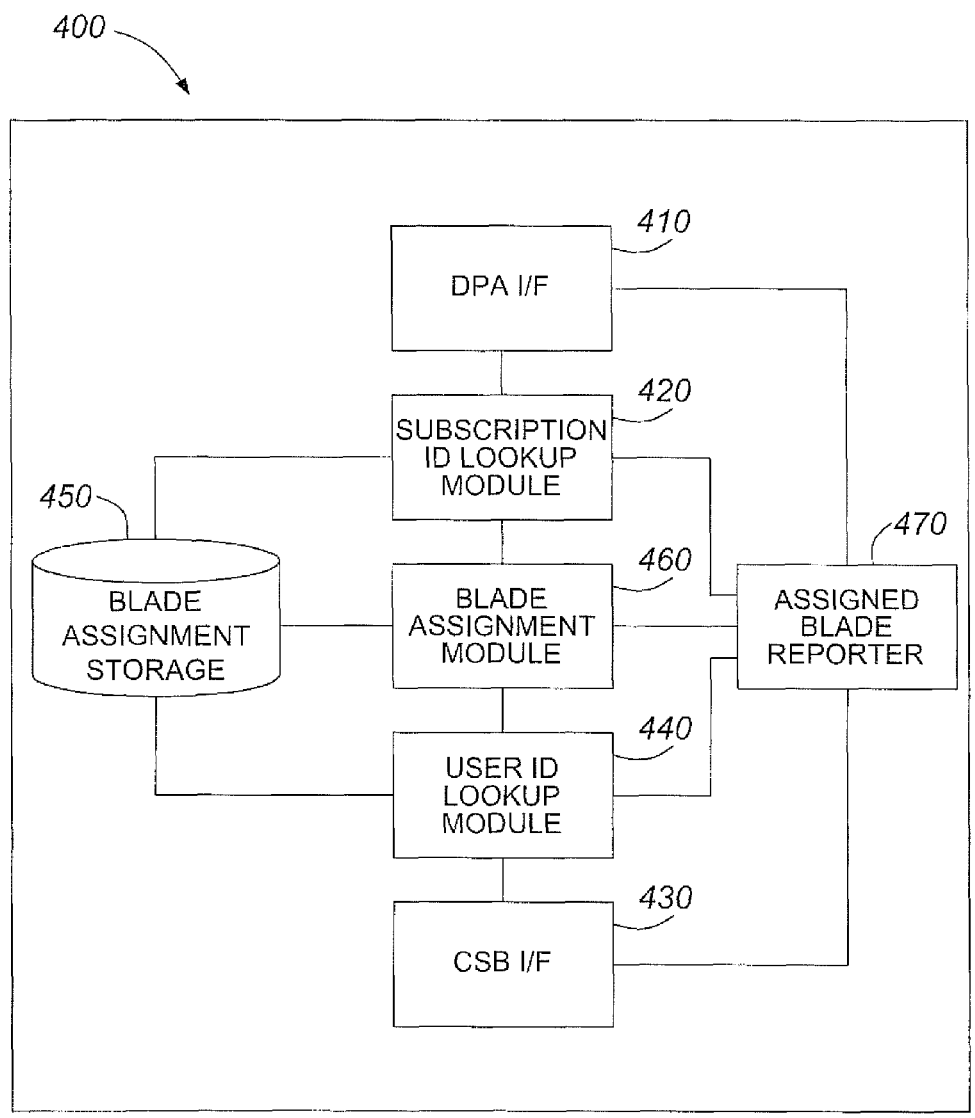
FIG. 4 illustrates an exemplary subscriber assignment module.

FIG. 4 illustrates an exemplary subscriber assignment module (SAM) 400. SAM 400 may correspond to SAM 350 of PCRN message router 300. As previously noted, SAM 400 may alternatively be implemented as a separate blade and/or device that may be accessed by various external blades and/or devices. SAM 400 may include a DPA interface 410, subscription identifier lookup module 420, CSB interface 430, user identification lookup module 440, blade assignment storage 450, blade assignment module 460, and/or assigned blade reporter 470.

DPA interface 410 may be an interface comprising hardware and/or executable instructions encoded on a machine-readable storage medium configured to communicate with a DPA. As such, DPA interface 410 may receive a request for an assigned blade from a DPA including at least one subscription identifier and may transmit a response including the requested assigned blade.

Subscription identifier lookup module 420 may include hardware and/or executable instructions on a machine-readable storage medium configured to attempt to locate an assignment record in blade assignment storage 450 that matches one or more subscription identifiers. If such a record is located, subscription identifier lookup module 420 may forward the record to assigned blade reporter 470. Otherwise, subscription identifier lookup module 420 may forward the subscription identifiers to blade assignment module 460. In various alternative embodiments, subscription identifier lookup module 420 may also receive one or more user identifiers from a DPA. In such embodiments, subscription identifier lookup module 420 may transmit the user identifiers to user identifier lookup module 440 before referring to blade assignment module 460.

In various embodiments, subscription identifier lookup module 420 may also be configured to update an assignment record upon learning of new subscription identifiers. For example, if subscription identification lookup module 420 receives a request including subscription identifiers a, b, and c and locates a record that includes only subscription identifiers a and c, subscription identification lookup module 420 may update the located record to include subscription identifier b.

CSB interface 430 may be an interface comprising hardware and/or executable instructions encoded on a machine-readable storage medium configured to communicate with a CSB. As such, CSB interface 430 may receive a request for an assigned blade from a CSB including at least one user identifier and may transmit a response including the requested assigned blade.

User identification lookup module 440 may include hardware and/or executable instructions on a machine-readable storage medium configured to attempt to locate an assignment record in blade assignment storage 450 that matches one or more user identifiers. If such a record is located, user identifier lookup module 440 may forward the record to assigned blade reporter 470. Otherwise, user identifier lookup module 440 may forward the user identifiers to blade assignment module 460. In various alternative embodiments, user identifier lookup module 420 may also receive one or more subscription identifiers from a CSB. In such embodiments, user identifier lookup module 440 may transmit the user identifiers to subscription identifier lookup module 420 before referring to blade assignment module 460. In various embodiments, user identifier lookup module 440 may also be configured to update an assignment record upon learning of new user identifiers. For example, if user identification lookup module 440 receives a request including user identifiers 0x1, 0x2, and 0x3 and locates a record that includes only user identifiers 0x1 and 0x3, user identification lookup module 440 may update the located record to include user identifier 0x2.

Blade assignment storage 450 may be any machine-readable medium capable of storing various PCRN blade assignments. Accordingly, blade assignment storage 450 may include a machine-readable storage medium such as read-only memory (ROM), random-access memory (RAM), magnetic disk storage media, optical storage media, flash-memory devices, and/or similar storage media. In various embodiments, each blade assignment record stored in blade assignment storage 450 may include one or more subscription identifiers associated with a subscriber, one or more user identifiers associated with the subscriber, and an indication of which blade is assigned to the subscriber.

Blade assignment module 460 may include hardware and/or executable instructions on a machine-readable storage medium configured to assign a blade to a subscriber when no blade has been assigned to the subscriber previously. Blade assignment module 460 may further be configured to assign a blade to a temporary user in cases where, for example, the identified user is a roaming user or where identifiers for the subscriber are unavailable. Upon receiving an indication from subscription identifier lookup module 420 and/or user identifier lookup module 440 that a record could not be located for a given set of identifiers, blade assignment module 460 may select a blade for assignment to the subscriber. In doing so, blade assignment module 460 may employ various selection methods such as, for example, round robin assignment, load balancing among PCRN blades, random assignment, and/or partitioning of subscriber identities. Various alternative methods of selecting a PCRN blade to serve a particular user will be apparent to those of skill in the art.

After assigning a blade, blade assignment module 460 may create a new record for storage in blade assignment storage 450. In doing so, blade assignment module may include an identification of the assigned blade and any subscription identifiers and user identifiers available from the request. In various embodiments, blade assignment module may further attempt to locate a subscription record stored in an SPR (not shown) or elsewhere that matches one or more available identifiers. If such a subscription record is located, blade assignment module may add any additional subscription identifiers and/or user identifiers found in the subscription record to the new assignment record. After completing the new assignment record, blade assignment module 460 may forward the assignment record to assigned blade reporter 470.

Assigned blade reporter 470 may include hardware and/or executable instructions on a machine-readable storage medium configured to transmit an identification of an assigned blade to a DPA and/or CSB. Upon receiving an assignment record from subscription identifier lookup module 420, user identification lookup module 440, and/or blade assignment module 460, assigned blade reporter 470 may extract an identification of the assigned blade from the record. Then, assigned blade reporter 470 may transmit a response to the entity that sent the request to indicate the assigned blade.

Figure 5:
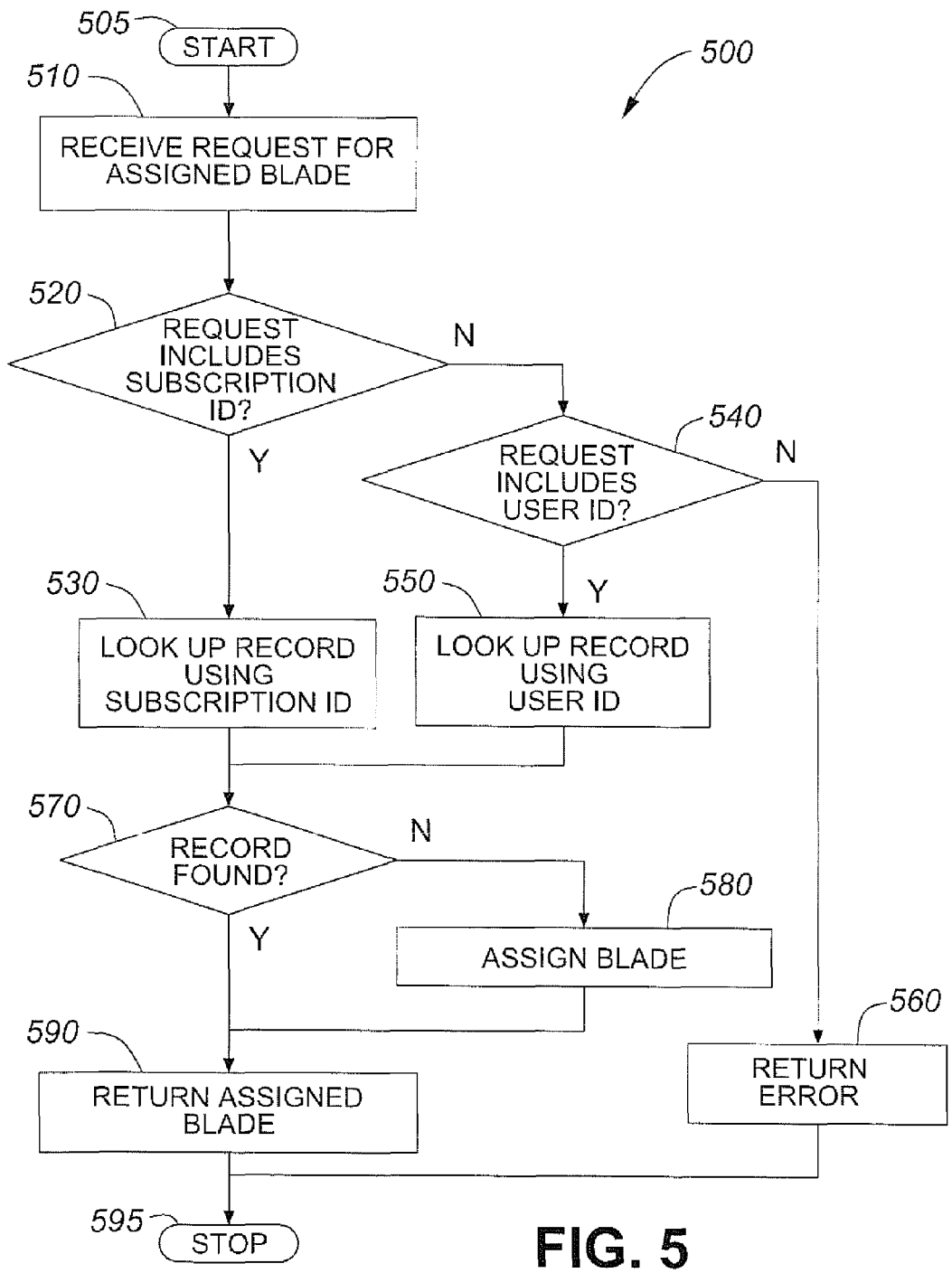
FIG. 5 illustrates an exemplary method for determining an assigned PCRN blade for a subscriber.

FIG. 5 illustrates an exemplary method 500 for determining an assigned PCRN blade for a subscriber. Method 500 may be performed, for example, by the components of SAM 400. Method 500 may begin in step 505 and proceed to step 510 where the SAM may receive a request for an assigned blade. Next, in step 520, the SAM may determine whether the request includes one or more subscription identifiers. The SAM may make this determination for example, by examining the contents of the request and/or by determining the type of entity that sent the request. If the request was received from a DPA, the request may include a subscription identifier, while if it was received from a CSB, the request may not include a subscription identifier. If the request does include a subscription identifier, the method 500 may proceed to step 530, where the SAM may attempt to look up an assignment record that includes the one or more subscription identifiers.

If, on the other hand, the request does not include a subscription identifier, the SAM may instead determine whether the request includes a user identifier in step 540. This step 540 may include examining the contents of the request and/or by determining the type of entity that sent the request. If the request was received from a CSB, the request may include a user identifier. If the request does include a user identifier, the method 500 may proceed to step 550, where the SAM may attempt to look up an assignment record that includes the one or more user identifiers. Otherwise, the SAM may return an error to the requesting entity in step 560. In various alternative embodiments, when no subscription identifiers or user identifiers have been provided, the SAM may attempt to set up a temporary assignment. In such embodiments, method 500 may proceed from step 540 to step 580 instead of step 560.

After attempting to locate an assignment record in either step 530 or step 550, the method may proceed to step 570 where the SAM may determine whether a matching record was in fact located. If so, method 500 may proceed directly to step 590. If no record was found however, the SAM may, in step 580, assign a blade to the user and create a new assignment record. The SAM may include the subscription and/or user identifiers included in the request in the record and may also refer to other sources such as an SPR to locate additional subscription/user identifiers for inclusion in the new record. Finally in step 590, the SAM may, return the assigned blade as identified in the located or newly created record to the entity that sent the request in step 510. Method 500 may then proceed to end in step 595. Thereafter, the entity may use the SAM's response to forward a received message to the assigned blade for the subscriber associated with the message.

According to the foregoing, various embodiments enable the efficient use of multiple serving device instances. In particular, by assigning each subscriber to a particular device instance and forwarding requests to the appropriate device instance, a PCRN or other device may increase overall system efficiency and obviate the need for some consistency considerations.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method performed by a network device for distributing subscribers among multiple serving devices, wherein each of the multiple serving devices communicate with a network via the network device, the method comprising:
   receiving, at the network device from an entity, a request for a serving device assigned to a subscriber;
   locating an assignment record associated with the subscriber;
   in response to locating the assignment record associated with the subscriber, identifying an assigned serving device of the multiple serving devices indicated by the assignment record as being assigned to the subscriber; wherein each of the multiple serving devices comprises a policy and charging rules node (PCRN) blade; and
   transmitting a response to the entity, wherein the response identifies the assigned serving device.

2. The method of claim 1, wherein the step of locating an assignment record comprises:
   extracting at least one subscription identifier from the request; and
   locating an assignment record including the at least one subscription identifier.

3. The method of claim 2, further comprising:
   receiving, at the network device from a second entity, a second request for a serving device assigned to the subscriber;
   extracting at least one user identifier from the second request, wherein the at least one user identifier is a different type from the at least one subscription identifier;
   locating the assignment record based on the at least one user identifier, wherein the assignment record includes the at least one user identifier; and
   in response to locating the assignment record based on the at least one user identifier, transmitting a second response to the second entity, wherein the second response identifies the assigned serving device.

4. The method of claim 1, wherein the step of locating an assignment record associated with the subscriber comprises:
   determining that the network device does not store an assignment record associated with the subscriber;
   assigning a serving device of the plurality of serving devices to the subscriber; and
   generating a new assignment record associated with the subscriber and including an indication of the assigned serving device.

5. The method of claim 1, wherein the entity includes at least one of a diameter proxy agent and a common services blade (CSB).

6. The method of claim 1, wherein the step of locating an assignment record associated with the subscriber comprises:
   determining whether the request includes at least one subscription identifier of the subscriber;
   if the request includes at least one subscription identifier, locating an assignment record that includes the at least one subscription identifier;
   if the request does not include at least one subscription identifier:
   determining whether the request includes at least one user identifier of the subscriber, wherein the user identifier is of a type different from the subscription identifier;
   if the request includes at least one user identifier, locating an assignment record that includes the at least one user identifier.

7. The method of claim 1, wherein the step of locating an assignment record associated with the subscriber comprises:
   determining that the request includes an identifier associated with the subscriber;
   determining that the assignment record associated with the subscriber does not include the identifier associated with the subscriber; and
   adding the identifier to the assignment record.

8. A subscriber assignment device comprising:
   an interface that receives a request for an assigned blade from an entity, wherein the request includes an identifier associated with a requested subscriber, and wherein the assigned blade is one of a plurality of serving devices that communicate with a network via a same device, and wherein each of the plurality of serving devices comprises a policy and charging rules node (PCRN) blade;

a subscriber assignment storage that stores a plurality of assignment records, wherein each assignment record is associated with a subscriber and includes an identification of an assigned blade;

an identifier lookup module configured to locate an assignment record of the plurality of assignment records that includes the identifier associated with the requested subscriber; and an assigned blade reporter configured to, in response to the identifier lookup module locating the assignment record, report the identification of an assigned blade included in the assignment record to the entity.

9. The subscriber assignment device of claim 8, wherein:
the entity communicates with at least one other device using Diameter protocol;
the identifier associated with the subscriber is a subscription identifier; and
the identifier lookup module is a subscription identifier lookup module.

10. The subscriber assignment device of claim 9, further comprising:
a user identifier lookup module configured to, based on a second request for an assigned blade from a second entity and including a user identifier of a type different than the subscription identifier and associated with a second requested subscriber, locate a second assignment record of the plurality of assignment records that includes the user identifier associated with the second requested subscriber,
wherein the second entity communicates with at least one other device using a protocol other than the Diameter protocol, and
wherein the assigned blade reporter is further configured to report the identification of an assigned blade included in the second assignment record to the second entity.

11. The subscriber assignment device of claim 8, further comprising a blade assignment module configured to, if the identifier lookup module fails to locate an assignment record of the plurality of assignment records that includes the identifier associated with the requested subscriber:
assign a serving device of the plurality of serving devices to the subscriber; and
generate a new record associated with the subscriber and including an indication of the assigned serving device.

12. The subscriber assignment device of claim 8, wherein the entity is at least one of a diameter proxy agent (DPA) and a common services blade (CSB).

13. The subscriber assignment device of claim 8, wherein the subscriber assignment device and the entity are collocated on a single blade.

14. A tangible and non-transitory machine-readable storage medium encoded with instructions for execution by a network device for distributing subscribers among multiple serving devices, wherein each of the multiple serving devices communicate with a network via the network device, the tangible and non-transitory machine-readable storage medium comprising:
instructions for receiving, at the network device from an entity, a request for a serving device assigned to a subscriber;
instructions for locating an assignment record associated with the subscriber;
instructions for, in response to locating the assignment record associated with the subscriber, identifying an assigned serving device of the multiple serving devices indicated by the assignment record as being assigned to the subscriber; wherein each of the multiple serving devices comprises a policy and charging rules node (PCRN) blade; and
instructions for transmitting a response to the entity, wherein the response identifies the assigned serving device.

15. The tangible and non-transitory machine-readable storage medium of claim 14, wherein the instructions for locating an assignment record comprise:
instructions for extracting at least one subscription identifier from the request; and
instructions for locating an assignment record including the at least one subscription identifier.

16. The tangible and non-transitory machine-readable storage medium of claim 15, further comprising:
instructions for receiving, at the network device from a second entity, a second request for a serving device assigned to the subscriber;
instructions for extracting at least one user identifier from the second request, wherein the at least one user identifier is a different type from the at least one subscription identifier;
instructions for locating the assignment record based on the at least one user identifier, wherein the assignment record includes the at least one user identifier; and
instructions for, in response to locating the assignment record based on the at least one user identifier, transmitting a second response to the second entity, wherein the second response identifies the assigned serving device.

17. The tangible and non-transitory machine-readable storage medium of claim 14, wherein the instructions for locating an assignment record associated with the subscriber comprise:
instructions for determining that the network device does not store an assignment record associated with the subscriber;
instructions for assigning a serving device of the plurality of serving devices to the subscriber; and
instructions for generating a new assignment record associated with the subscriber and including an indication of the assigned serving device.

18. The tangible and non-transitory machine-readable storage medium of claim 14, wherein the entity includes at least one of a diameter proxy agent and a common services blade (CSB).

19. The tangible and non-transitory machine-readable storage medium of claim 14, wherein the instructions for locating an assignment record associated with the subscriber comprise:
instructions for determining whether the request includes at least one subscription identifier of the subscriber;
instructions for if the request includes at least one subscription identifier, locating an assignment record that includes the at least one subscription identifier;
instructions for, if the request does not include at least one subscription identifier:
determining whether the request includes at least one user identifier of the subscriber, wherein the user identifier is of a type different from the subscription identifier;
if the request includes at least one user identifier, locating an assignment record that includes the at least one user identifier.

20. The tangible and non-transitory machine-readable storage medium of claim 14, wherein the instructions for locating an assignment record associated with the subscriber comprise:
instructions for determining that the request includes an identifier associated with the subscriber;

instructions for determining that the assignment record associated with the subscriber does not include the identifier associated with the subscriber; and instructions for adding the identifier to the assignment record.

* * * * *